US012373449B1

(12) United States Patent
Dassum (10) Patent No.: US 12,373,449 B1
(45) Date of Patent: Jul. 29, 2025

(54) SEARCH ENGINE FOR CONNECTING ENTERTAINMENT INDUSTRY ENTITIES

(71) Applicant: Saadin Dassum, Sunny Isles Beach, FL (US)

(72) Inventor: Saadin Dassum, Sunny Isles Beach, FL (US)

( * ) Notice: Subject to any disclaimer, the term of this patent is extended or adjusted under 35 U.S.C. 154(b) by 0 days.

(21) Appl. No.: 18/798,241

(22) Filed: Aug. 8, 2024

(51) Int. Cl.
*G06F 16/245* (2019.01)
*G06F 16/2457* (2019.01)
*G06F 16/901* (2019.01)
*G06F 16/953* (2019.01)

(52) U.S. Cl.
CPC .... *G06F 16/24578* (2019.01); *G06F 16/9027* (2019.01); *G06F 16/953* (2019.01)

(58) Field of Classification Search
CPC ............. G06F 16/24578; G06F 16/953; G06F 16/9027
See application file for complete search history.

(56) References Cited

U.S. PATENT DOCUMENTS

| 8,515,893 B2 | 8/2013 | Wilson et al. |
| 2009/0287687 A1 | 11/2009 | Martire et al. |
| 2012/0197651 A1* | 8/2012 | Robinson ............... G06Q 30/02 715/761 |

* cited by examiner

*Primary Examiner* — Truong V Vo
(74) *Attorney, Agent, or Firm* — Sanchelima & Associates, P.A.; Jesus Sanchelima; Christian Sanchelima (57) ABSTRACT

A search engine for connecting entertainment industry entities including a computerized device and a search engine module. The computerized device is programmed with an application having a user interface to interact with users of entertainment entities. The users introduce data preferences through the user interface. The application connects the artists with venues based on preference scores. The search engine module includes a tree data structure and a matching module. The tree data structure is formed by a hierarchical structure of nodes representing genres connected through links creating genre relationships. The matching module analyzes the data introduced by the users and scores how related the different entertainment entities are related to each other.

11 Claims, 5 Drawing Sheets

SEARCH ENGINE FOR CONNECTING ENTERTAINMENT INDUSTRY ENTITIES

BACKGROUND OF THE INVENTION

1. Field of the Invention

The present invention relates to search engines and, more particularly, to a search engine for connecting entertainment industry entities that includes an application with an user interface that allows users to find entertainment entities.

2. Description of the Related Art

Several designs for search engines have been designed in the past. None of them, however, include a search engine for connecting entertainment industry entities that includes a specialized tree data structure to organize different genres creating a variety of relationships between the genres.

Applicant believes that a related reference corresponds to U.S. Pat. No. 8,515,893 issued for systems and methods for providing recommendations based on collaborative and/or content-based nodal interrelationships. The interrelationships may be positive or negative and may accumulate with other links. The recommendation engine in certain embodiments determines recommended venues based on user attributes and venue preferences by aggregating the link matrices and determining the venues which are most strongly coupled to the user. Applicant believes that another related reference corresponds to U.S. patent application No. 20090287687 related to a system and method for recommending venues and events of interest to a user including an intelligent technique for learning user interests based on user actions and then applying the learned knowledge to rank, recommend, and/or filter new items based on the level of interest to a user. More particularly the invention relates to an automated, personalized information learning and recommendation engine for recommending venues and events to individual users using a combination of collaborative filtering and integrating social behavioral pattern data gathered and computed via an electronic device. None of these references, however, teach of a search engine for connecting entertainment industry entities that includes a Computerized Engine for Reaching and Acquiring True Imaginatives System (CERATI) that facilitates efficient and complex connections within the entertainment industry.

The system specifically connects entertainment entities including users and non users. It incorporates a novel tree data structure to represent and match genres across various media. The tree data structure is a data structure customized to represent and match genres and relationships. The tree data structure uses unique alphanumeric identifiers assigned to each genre. The alphanumeric identifiers encode a genre's position and relationships within a hierarchical structure, enabling identification of ancestor-descendant, sibling relationships, and influences. CERATI leverages the data structure through key components including a user interface for input/output, a database for data storage, and an intelligent search engine for multi-factor genre matching, scoring based on prioritized criteria, and efficient sorting algorithms. The aforementioned key components allow CERATI to connect users within the entertainment industry accurately based on their genre preferences and attributes, accommodating new/emerging genres for future-proofing.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a search engine for connecting entertainment industry entities that includes a novel tree data structure that introduces a hierarchical structure of relationships between different genres and subgenres allowing the traceability between genres and subgenres.

It is another object of this invention to provide a search engine for connecting entertainment industry entities that includes a genre matching module that uses the tree data structure to perform intelligent genre matching based on the user's genre inputs.

It is still another object of the present invention to provide a search engine for connecting entertainment industry entities that includes a preference matching module that matches follower scores, query scores, genre scores, location scores, originals/cover scores, and repertoire scores.

It is yet another object of the present invention to provide a search engine for connecting entertainment industry entities that has a score and prioritization module that combines individual scores of the matching modules, the scores are weighted based on the prioritization preferences including location and genres preferences.

It is yet another object of this invention to provide such a search engine for connecting entertainment industry entities method that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates a diagram representation of the score module 225 including the prioritization module 225a.

DETAILED DESCRIPTION OF THE EMBODIMENTS OF THE INVENTION

Referring now to the drawings, where the present invention is generally referred to with numeral 10, it can be observed that it basically includes an application 110 programmed with an user interface to access the search engine. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 1:
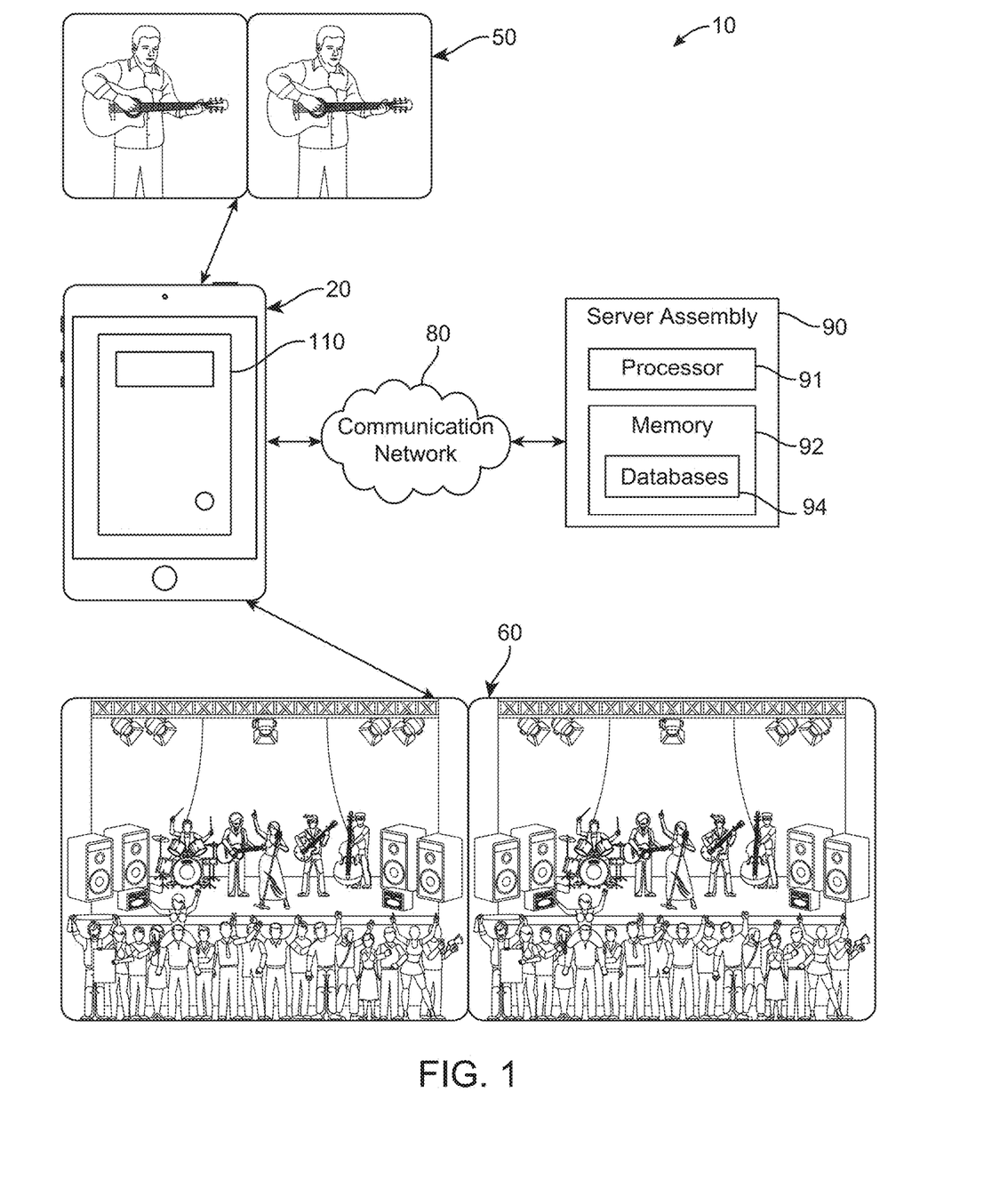
FIG. 1 represents a diagram of the present invention 10 showing artists 50 and venues 60 interacting with an application 110. The application 110 is in communication with a server assembly 90 through a communication network 80.

The application 110 may be programmed to be installed into a computerized device 20 such as cell phones, laptops, tablets, personal computers, or any other suitable computerized device 20. The application 110 may allow entities to connect and find other entertainment entities. The entities may be user entities such as artists and venues. It also may be suitable to have non-user entities such as events. In one of the preferred embodiments, the application 110 may allow artists 50 to connect with suitable venues 60. The application 110 may connect artists 50 and venues 60 considering music genres, locations and other preferences.

The application 110 may be connected to a server assembly 90 through a communication network 80. The server assembly 90 may include a processor 91, and a memory 92. The memory 92 may store databases 94. The databases 94 may store the information introduced by the users through the application 110. The processor 91 may process the information from the databases 94. The processor 91 may manage the data flow from and to the application 110 through the communication network 80.

Figure 2:
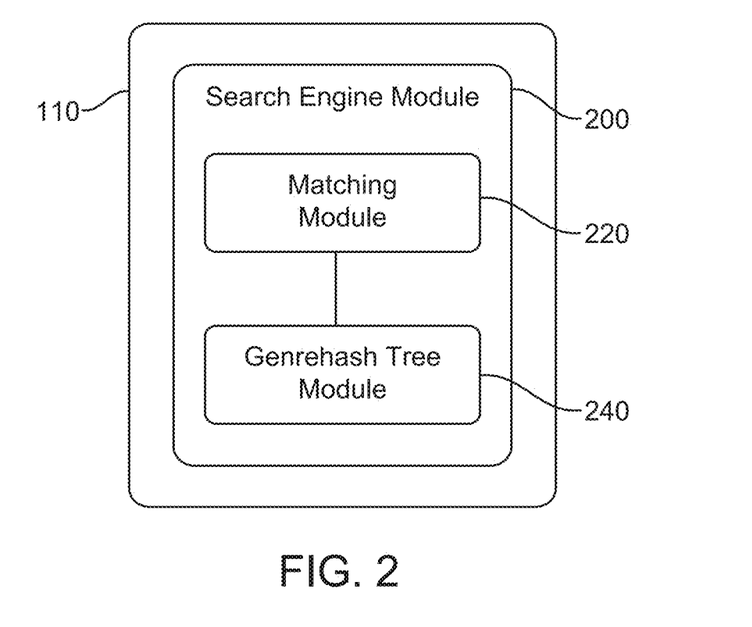
FIG. 2 shows a diagram representation of the modules of the application 110 including the matching module 220 and the genrehash tree module 240.

The application 110 may be programmed to include the search engine module 200. The search engine module 200 may include submodules including a matching module 220, and a genrehash tree module 240. The genrehash tree module 240 is a novel data structure that may represent and match genres across various media including but not limited to music, movies, video games, literature, or the like. The genrehash tree module 240 may allow identification of relationships between genres. The genrehash tree module 240 may represent and work with genres in various forms of digital media including but not limited to music, movies, books, and video games. The genrehash tree module 240 may provide a flexible and efficient way of organizing, encoding, and searching for genres, as well as identifying relationships between them.

Figure 5:
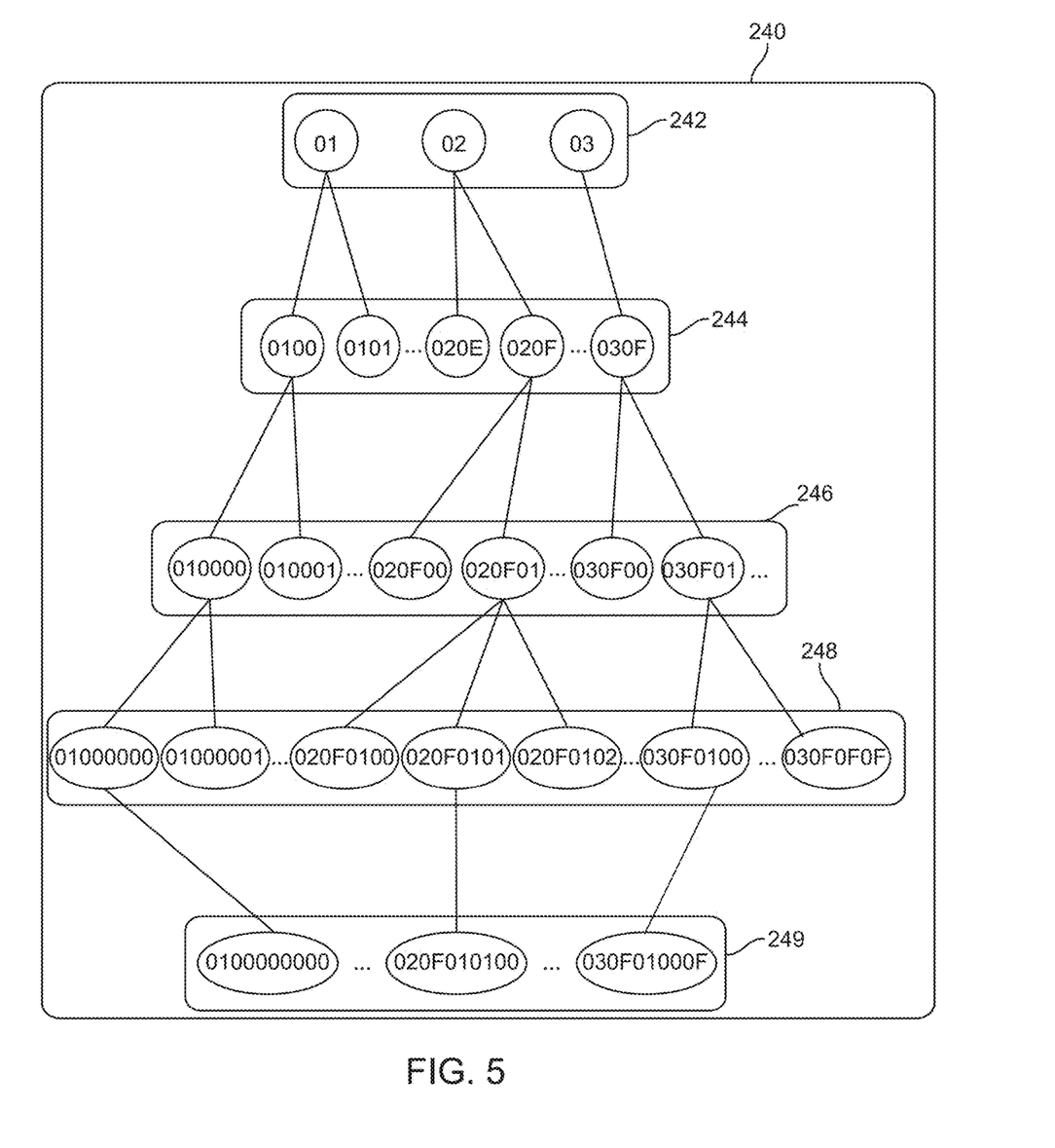
FIG. 5 depicts the genrehash tree module 240 showing the relationships between different nodes.

The genrehash tree module 240 may have a plurality of nodes to represent different genres in the tree structure as observed in FIG. 5. Each of the nodes may be assigned a genrehash. The genrehash may be a unique hash. The unique hash may be an alphanumeric code. The unique alphanumeric hash may encode the position of a genre and the relationships within the hierarchical tree. In one of the preferred embodiments, the genrehash may be defined by a combination of hexadecimal characters. In other embodiments, the genrehash may be built using other suitable types of characters or other number systems. Preferably, the genrehash tree may have a hierarchical structure with root genres at a top level of the tree and subgenres branching out as child nodes. The tree structure may allow an efficient representation of parent-child, ancestor-descendant, and sibling relationships between genres. Each of the nodes may contain metadata including the genre name, genrehash, redirect information, history of the genre, influences, and alternative names. Each of the nodes may also contain methods for determining the relationships with other nodes including checking if a node is a parent, child, ancestor, descendant or sibling of another node. The nodes may further have a method for calculating the deepest common ancestor. The nodes may further have a method for handling redirects. The redirect method may be assigned for the first root value of the alphanumeric hash. The redirect method may be assigned for handling genres without a direct genealogical connection or ancestry within the main genre hierarchy of the genrehash tree. In one of the preferred embodiments, the redirect node genrehashes may use genrehash starting with the hexadecimal character 00. The redirect information may allow the incorporation and linkage of genres that may be influenced by other genres or have similarities without having direct ancestors in the genre hierarchy. The redirect information may provide a flexible way to represent relationships between genres beyond only ancestral lines in the genrehash tree structure. The redirect method may encode the non-genealogical connections using the reserved "00" prefix in the genrehash.

The genrehash tree module 240 may further implement tries, hashmaps and other suitable supporting data structures to facilitate efficient lookups and operations. The tries may be used for efficient lookup of genres by their names or partial names. The hashmaps may be used for mapping genrehashes to the corresponding nodes, to track influences between genres, registering redirects, and managing the latest child nodes for efficient tree construction. The genrehash tree module 240 may be designed to be flexible and extensible, allowing for the addition of new genres, modification of existing genres, and adaptation to different forms of media including music, games, literature, movies, and other suitable media. The genrehash tree module 240 may facilitate intelligent genre matching and searching by leveraging the encoded relationships and auxiliary data structures of the nodes. The genrehash tree module 240 may allow the search of genres based on ancestry, influences, proximity, and redirects, enabling multi-factor genre matching. The tree structure may allow an efficient identification of relationships between genres. The genrehash tree module 240 may allow the scoring and ranking of potential matches of genres. The tree structure of the genrehash tree module 240 may allow to introduce new and emerging genres, allowing entertainment industries and media forms to evolve and easily update the hierarchical tree data structure.

Referring now to FIG. 5, an example of tree structure of the genrehash tree module 240 can be observed. In one embodiment, the tree structure of the genrehash tree module 240 may have root nodes 242, first descendant nodes 244, second descendant nodes 246, third descendant nodes 248, and fourth descendant nodes 249. In one exemplary embodiment, the root nodes 242 may include three nodes representing root genres including Classical, Jazz, and Other. The root genre "Other" may broadly enclose popular music genres. The root nodes 242 may be assigned with two digits of hexadecimal characters. For example, the Classical genre may be assigned with a 01, the Jazz genre may be assigned with a 02, and Other may be assigned with a 03. A fourth node may be included with a 00 hexadecimal hash representing the redirect genres to link genres without genealogical connections. It should be understood that the genrehash may allow to represent up to 256 genres by the combination of the two first hexadecimal characters. The root nodes 242 may allow to assign 255 genres and 1 node reserved for the redirect node. Each of the genrehash nodes may include a redirectFrom parameter which may be an optional parameter. For example a redirect node for Indie may be represented by a hash 0000. When creating Indie rock (descendant of Other 03 and Rock 0F), the genrehash may include the hash 030Fxx and further a hash of 0000 assigned to the parameter redirectFrom. To search the matched users and/or nonusers, an array containing the iterations through user hashes may be performed to form an array of the hashes found. If a hash 0000 is found, then it means that there is a matching redirectsFrom parameter. For example, if a venue user is searching for Indie, a request to the database is sent to search for users containing the redirect hash 0000, so the user may turn up as a result. When scoring the user, the scoring may go through all the hashes from the array and check if there are redirect matches in the hash.

The first descendant nodes 244 may include a first set of children nodes that descend from the root nodes 242. The first descendant nodes 244 may be subgenres that descend from the genres of the root nodes 242. Each of the first descendant nodes 244 may be assigned with a hash of four hexadecimal characters. The first two characters of the hash may correspond to the associated genre of the root nodes 242, thereby indicating the relationship between genres and subgenres. Each subgenre may be assigned with a hash including the first two digits of the ancestor node and the unique last digits assigned to the subgenre. For example, the node 030F may represent the sixteenth subgenre of Other genre assigned with the hexadecimal hash 03. In one embodiment, the node 030F may represent the subgenre Rock. Each node of the root nodes 242 may have up to 256 children nodes represented by the hexadecimal hash.

The second descendant nodes 246 may represent descendant nodes from the first descendant nodes 244. The second descendant nodes 246 may have a hash formed by six hexadecimal characters including two characters related to the root nodes 242, two characters related to the first descendant nodes 244 and the last two characters assigned for the particular subgenre of the second descendant nodes 246. The first four characters of the hash of the nodes of the second descendant nodes 246 may associate the subgenre of the second descendant nodes 246 with the ancestors from first descendant nodes 244 and root nodes 242. For example, the nodes 030F00 and 030F01 may be descendant nodes of the node 030F. The node 030F00 may encode the genre Alternative rock, which is a subgenre of Rock 030F. The node 030F01 may encode the genre Metal which is a subgenre of Rock 030F.

The third descendant nodes 248 may represent descendant nodes from the second descendant nodes 246. In one embodiment, the third descendant nodes 248 may have a hash formed by eight hexadecimal characters. The first six characters may be associated with ancestor genres of the genres of the third descendant nodes 248 including ancestors from second descendant nodes 246, first descendant nodes 244, and root nodes 242. The last two digits are assigned for the subgenre of third descendant nodes 248. For example, the subgenre Metal 030F01 may have a descendant node 030F0100 representing subgenre Doom Metal. The fourth descendant nodes 249 may represent descendent nodes from the third descendant nodes 248. The fourth descendant nodes 249 may have a subgenre encoded by a hexadecimal hash of 10 characters. The first eight characters may associate the node with the ancestors. It should be understood that each node of each of the set of nodes may have a plurality of descendant nodes representing subgenres derived from the parent genre/subgenre. The hexadecimal hash may allow each of the nodes to have up to 256 descendant nodes. The tree structure may allow the implementation of n-levels of sub-nodes which may be limited by the memory of the computerized device and the programming language used to implement it.

Figure 4:
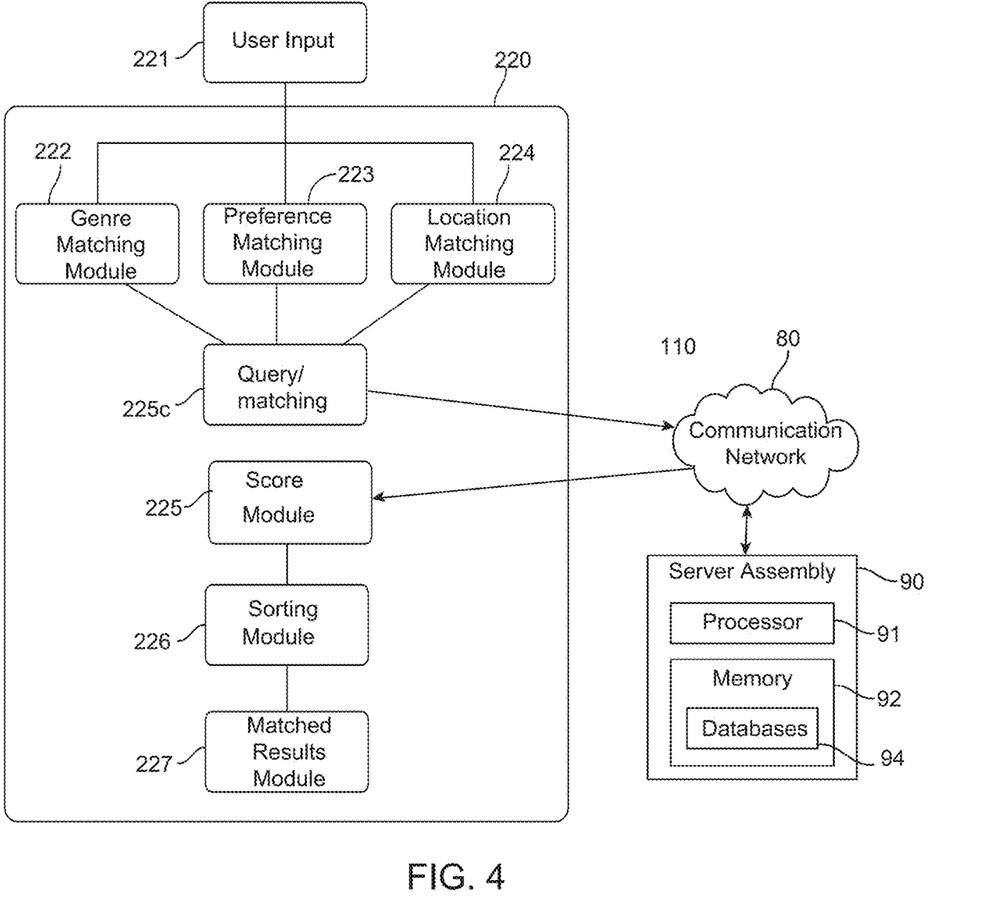
FIG. 4 is a representation of the architecture of the matching module 220. in communication with the server assembly 90 through the communication network 80.

Best observed in FIG. 4, the matching module 220 may receive information from a user input 221. The matching module 220 may include matching modules including a genre matching module 222, a preference matching module 223, and a location matching module 224. The genre matching module 222, preference matching module 223 and location matching module 224 may transform the user input into a query through a query module 225c. The query module 225c may be used to send processable data to the databases 94 of the server assembly 90. The processor 91 process the data in the server assembly 90 simplifying the matches. The processor 91 may send the simplified data to the application 110 allowing the score module 225 to score the matches.

The score module 225 may provide a score of the matches to the sorting module 226. The sorting module 226 may be a module programmed to be run by the application 110. The sorting module 226 may sort the matched results by score. The sorted results may be shown by the matched results module 227 in the user interface of the application 110. The matched results module 227 may provide the information of the matched results scored and sorted to the user. The matching module 220 may be a multi-factor matching module. The user input 221 may handle the user inputs related to search criteria, such as genres, locations, and preferences such as but not limited to user types, covers, and originals. The genre matching module 222 may use the genrehash tree module 240 to perform intelligent genre matching on user inputs and retrieve user data. The preference matching module 223 may find matches based on user preferences such as user types (musicians, venues, or the like), preferences for covers or originals, or other suitable preferences. The location matching module 224 may perform a location-based matching based on user input locations and the retrieved user locations.

Figure 3:
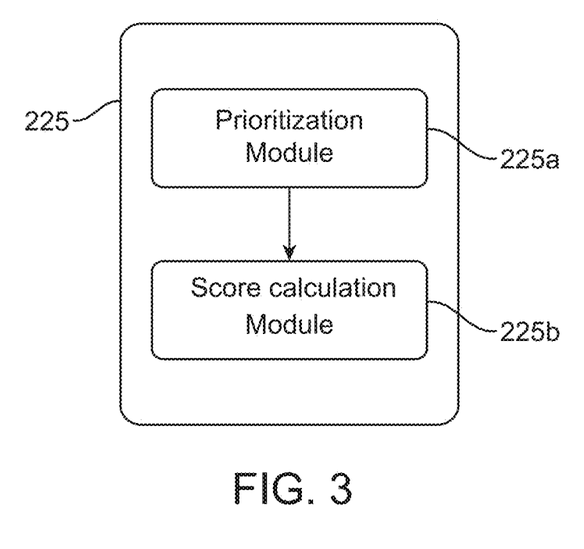

The score module 225 may basically include a prioritization module 225a and a score calculation module 225b. The prioritization module 225a may allow the users to prioritize the matching criteria (genres, location, or other preferences) based on the importance for the user. The score calculation module 225b may calculate scores for the matched results based on prioritized criteria and other factors. It should be understood that the matching module 220 containing the score module 225 may be in communication with the genrehash tree module 240 to allow the score module 225 to use the genrehash tree module 240. The score module 225 may use the genrehash tree module 240 to calculate genre scores based on the ancestry and influence relationships between the user's genres and the potential match genres. Higher scores may be assigned for closer relationships. For example, an exact match may have a higher score than a parent-child relationship, while a parent-child relationship may have a higher score than an influenced by relationship. The score calculation module 225b may calculate a score based on the location and the proximity between the location of the user and the location of the potential match. Closer proximities may have a higher location score. The user type may have an assigned score, for example artists and venues. The score module 225 may allow to weigh the individual scores based on the prioritization preferences. For example, if the user prioritizes genres over location, the genres score may be given a higher weight. The matching module 220 may allow artist users to prioritize genres and venues to be matched with venues that align with the musical genres and with higher preference for hosting artists. The venue users may be matched with artists in close proximity who play genres that align with the venue user's preferences. The preferences such as preferences for covers or originals may further refine the matches between venues and artists based on the user's preferences. It should be understood that users may toggle every criteria and preference on or off. The score module 225 may calculate scores based on the preferences, location and genres of users applying prioritization weights to ensure that venues are matched with suitable artists, and vice versa. Users may select the preferences to be considered during the search. The score module 225 may facilitate efficient connections within the entertainment industry.

The sorting module 226 may employ an efficient sorting algorithm such as radix sort or the like to sort the scored matches and present the results in a desired order. The sorting module 226 may rank the matched results based on the scores. The matched results module 227 may present the sorted scored matches based on the user inputs and matching criteria.

FIG. 4 may be associated with a method for matching entertainment entities using a genrehash tree including a first step for receiving data from users from entertainment entities through the user interface of the application 110 programmed in the computerized device 20, where the data includes genres associated with the users. The method further may include a second step for analyzing the genres based on a genrehash tree having nodes representing genres, where each node is assigned a unique alphanumeric genrehash encoding a position and relationships of genres within a hierarchical tree structure. The method may further have a third step for identifying ancestry, descendant, sibling, influence and other relationships between the genres based on the genrehash tree. The method further may include a fourth step for calculating genre matching scores based on the relationships. The method further may include a fifth step for assigning high scores to close relationships. The method further may have a sixth step for obtaining additional matching criteria including location information and user preferences for the entertainment industries. The method also may include a seventh step for calculating combined matching scores based on the genre matching scores and the additional matching criteria, including applying prioritization weights based on prioritized criteria. The method may further include an eighth step for sorting the entertainment entities based on the combined matching scores. The method may have a ninth step for presenting the sorted entertainment entities through the user interface to facilitate matching of compatible entertainment entities.

The method for matching entertainment entities may be based on genre relationships and the rankings of the relationships. The ranking relationships may allow users to find other users or non-user items such as events. The relationship scores and weights may be based on the seek types and in the relationships. The seek types may be the direction of the genre matching being performed by the method specifying the type of entity that is seeking or being matched against another type. Seek types may be defined inside data types such as enum. The seek types may include artist seeking artist type, artist seeking event type, venue seeking artist, venue seeking event, artist seeking artist, and venue seeking venues. The seek type may use a seek type method to find the current seek type. The method may use conditional statements to determine the current seek type by comparing the current user with the object of the match to compare. The seek type may allow ranking matches. The seek types may have mirror seek types. For example, artist seeking venue may be the mirror of venue seeking artist. The seek type mirror relationships may allow swapping scores.

The relationships between entities may include 10 types of relationships and a no relation relationship. The genre relationships may include the following relationships: is equal relationship, is parent of relationship, is child of relationship, is ancestor of relationship, is descendant of relationship, is sibling of relationship, is influence of relationship, is influenced by relationship, is redirect of relationship, redirects to relationship, and no relation between genres. Each of the aforementioned relationships may be methods or functions implemented in the processor 91. The relationship methods may return a boolean value. The relationship methods may be mirror relationships of other relationship methods. For example, is parent of relationship may be the mirror relationship of is child of relationship. Is ancestor of relationship may be mirror relationship of is descendant of relationship. And is influence of relationship may be the mirror relationship of is influenced by relationship. The mirror relationships may allow to reduce the group of relationships to seven groups of relationships for the purpose of scoring relationships.

The rankings of relationships between genres may depend on values of the type of relationship and the seek type. For instance a relationship is equal may have a higher score than the other relationships. The relationships is parent of, is redirect of, redirects, and is child of may have a smaller weight than the equal relationship. The relationships is sibling of, is influence of, and is influenced by may have the same weight and may be a smaller weight than the weight of the is redirect of relationship. The no relation may have a weight of zero. The relationships is ancestor of and is descendent of may have a variable weight based on a function of the distance between nodes. In one embodiment, the function may be a sigmoid function with a s-shaped curve smoothly transitioning between two horizontal asymptotes, where as the distance between genres tends to infinity, the weight of the function tends to a first of the asymptotes, and as the distance between genres tends to minus infinity, the weight of the function tends to a second of the asymptotes. It also may be suitable for the is ancestor of and is descendant of relationships to implement other functions that allow a smooth transition of values between the two asymptotes. The weight function for is ancestor of and is descendant of may allow to modify the range of the function, the upper bound, the lower bound, the curve factor, and the shift factor of the function. Preferably, the maximum weight of a combination of relationships with no equal to relationships may be less than the weight of equal to relationship.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A search engine for connecting entertainment industry entities, comprising:
   a) a computerized device programmed with an application having a user interface to interact with entertainment entities including artists and venues, wherein the entertainment entities introduce data through the user interface, wherein said application connects the artists with the venues; and
   b) a search engine module including a matching module and a genrehash tree module, wherein the genrehash tree module is a tree data structure, said genrehash tree module uses unique alphanumeric identifiers assigned to genre entities, said identifiers encode relationships between the genre entities defining a genreshash tree with a hierarchical structure enabling identification of ancestor-descendant and sibling relationships and influences, said matching module includes a multi-factor genre matching module with a score module, said genre matching module analyzes the data introduced by the entertainment entities, said score module ranks how related the entities are to each other.

2. The search engine for connecting entertainment industry entities set forth in claim 1, wherein said genrehash tree module represents media genres including music, movies, video games, and books.

3. The search engine for connecting entertainment industry entities set forth in claim 1, wherein said genrehash tree module includes a plurality of nodes, each node of the plurality of nodes represents a genre and contains metadata including a genre name, a genrehash, redirect information, genre history, and alternative names.

4. The search engine for connecting entertainment industry entities set forth in claim 3, wherein said genrehash is a combination of alphanumeric characters encoding a position and relationships of the genres within the tree data structure.

5. The search engine for connecting entertainment industry entities set forth in claim 1, wherein the genrehash tree module represents genres in a hierarchical tree structure with root genres at a top level and subgenres branching out as child nodes.

6. The search engine for connecting entertainment industry entities set forth in claim 1, wherein said matching module further includes a preference matching module to find matches based on user preferences including types of entertainment entities, and preferences for cover performances or original works.

7. The search engine for connecting entertainment industry entities set forth in claim 1, wherein the matching module further includes a location matching module to perform location-based matching based on locations of entertainment entities.

8. The search engine for connecting entertainment industry entities set forth in claim 1, wherein said score module includes a prioritization module to prioritize matching criteria including genres, location, and preferences, said score module calculates scores based on prioritized criteria and relationships between genres identified by the genrehash tree module.

9. The search engine for connecting entertainment industry entities set forth in claim 8, wherein said matching module further includes a sorting module to sort the matched results based on the scores calculated by the score module.

10. A method for matching entertainment entities using a genrehash tree, the method comprising:
 a) receiving data from users from entertainment entities through a user interface of an application programmed in a computerized device, wherein the data includes genres associated with the users;
 b) analyzing the genres based on a genrehash tree having nodes representing genres, wherein each node is assigned a unique alphanumeric genrehash encoding a position and relationships of genre within a hierarchical tree structure;
 c) identifying ancestry, descendant, sibling, and influence relationships between the genres based on the genrehash tree;
 d) calculating genre matching scores based on the relationships;
 e) assigning high scores to close relationships;
 f) obtaining additional matching criteria including location information and user preferences for the entertainment industries;
 g) calculating combined matching scores based on the genre matching scores and the additional matching criteria, including applying prioritization weights based on prioritized criteria;
 h) sorting the entertainment entities based on the combined matching scores; and
 i) presenting the sorted entertainment entities through the user interface to facilitate matching of compatible entertainment entities.

11. A search engine for connecting entertainment industry entities, comprising:
 a) a computerized device programmed with an application having a user interface to interact with entertainment entities including artists and venues, wherein the entertainment entities introduce data through the user interface, wherein said application connects the artists with the venues; and
 b) a search engine module including a matching module and a genrehash tree module, wherein the genrehash tree module is a tree data structure, said genrehash tree module uses unique alphanumeric identifiers assigned to genre entities, said identifiers encode relationships between the genre entities defining a genreshash tree with a hierarchical structure enabling identification of ancestor-descendant and sibling relationships and influences, said matching module includes a multi-factor genre matching module with a score module, said genre matching module analyzes the data introduced by the entertainment entities, said score module ranks how related the entities are to each other.

* * * * *